Jan. 27, 1959   S. H. LANGER   2,871,454
GLYCIDYL POLYETHER-TRIETHANOLAMINE BORATE
COMPOSITION AND PRODUCT TREATED THEREWITH
Filed May 14, 1954

WITNESSES:
Bernard R. Gregure
James F. Young

INVENTOR
Stanley H. Langer
BY
Frederick Shape
ATTORNEY

United States Patent Office 2,871,454
Patented Jan. 27, 1959

2,871,454

GLYCIDYL POLYETHER-TRIETHANOLAMINE BORATE COMPOSITION AND PRODUCT TREATED THEREWITH

Stanley H. Langer, Pittsburgh, Pa., assignor to Westinghouse Electric Corporation, East Pittsburgh, Pa., a corporation of Pennsylvania Application May 14, 1954, Serial No. 429,967

12 Claims. (Cl. 336—96)

This invention relates to the process of curing glycidyl polyethers to produce therefrom hard resinous solid products particularly suitable for insulating electrical members, and the solid resinous products so produced.

Glycidyl polyethers have been heretofore cured by admixing them with certain amines or polycarboxylic acids and heating the resulting mixtures, whereupon hardened resinous products were obtained. However, numerous disadvantages have resulted from such prior art curing practices.

In particular, amine catalysts, such as diethylenetriamine, produce extremely reactive glycidyl polyether compositions and cannot be admixed with a glycidyl polyether for more than a few hours before use of the catalyzed resin. Gelation and hardening of the mixtures occur in about 3 to 4 hours. Consequently, only small batches of the catalyzed glycidyl polyethers are prepared and these must be used promptly. Any excess of resin in any small batch must be emptied out of the container in which it is kept and discarded inasmuch as its gelation and hardening within a mixing or storage tank would be highly undesirable since it would create a serious problem in cleaning and removal therefrom. The loss of time, wastage and other losses consequently are high. In addition, the amine catalysts cause dermatitis in those working with them and are a health hazard.

A further undesirable characteristic of amine catalyzed glycidyl polyethers is the fact that such cured resins have exceptionally poor electrical properties at elevated temperatures, and in some cases the electrical properties are seriously degraded by even moderate temperature rises above room temperature. For example, a given glycidyl polyether catalyzed with commonly used amine catalysts will have a power factor of from 27% to 30% at 100° C. with 60 cycle current. This has greatly limited the application of such resins in electrical application since such power factors are exceptionally high and cause improper functioning of electrical members treated therewith.

The use of an acid catalyst, such as maleic anhydride, is also attended with considerable difficulties. In the first place, the maleic anhydride can only be dissolved satisfactorily in the glycidyl polyethers at elevated temperatures. The tank life of the resulting catalyzed mixtures is slightly better than with amine catalysts but even so is limited to a few days. One of the main difficulties had with the maleic anhydride-glycidyl polyether mixtures is the necessity for heating the mixtures for prolonged periods of times at elevated temperatures of above 150° C. in order to poduce satisfactory cured resin products.

The object of this invention is to provide for admixing trialkylolamine borate with glycidyl polyethers in order to provide highly stable mixtures that will readily cure at elevated temperatures to produce good electrically insulating resinous products.

A further object of the invention is to provide for combining trialkylolamine borate and metallo-organic complexes with glycidyl polyethers to provide a stable composition that is rapidly curable at elevated temperatures.

A still further object of the invention is to provide electrical members insulated with a resinous composition comprising the reaction product of glycidyl polyethers and triethanolamine borate, in particular.

Other objects of the invention will in part be obvious and will in part appear hereinafter.

For a better understanding of the nature and objects of the invention, reference should be had to the following detailed description and drawing, in which.

Figure 1:
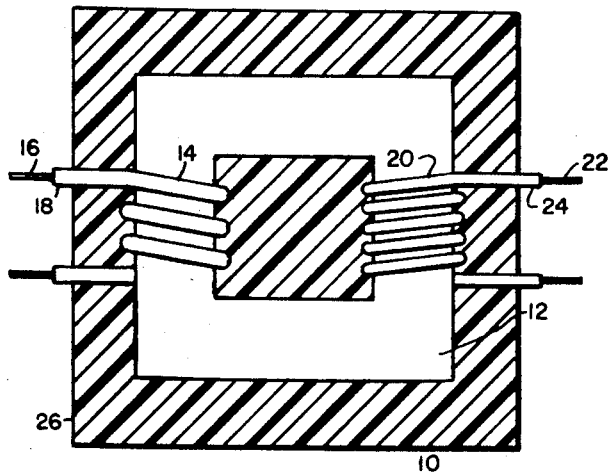
Figure 1 is a vertical sectional view through a transformer.

I have discovered that triethanolamine borate may be admixed with reactive glycidyl polyethers to produce a highly stable composition at room temperature which when subjected to temperatures of 100° C. to 175° C. and higher will cure rapidly to form hard, tough resinous products which have satisfactory electrically insulating properties at all ranges of temperatures. In particular, it has been found that the reactive glycidyl polyether of a dihydric phenol, said polyethers having a 1,2-epoxy equivalency of greater than one, may be admixed with from about 2% to 18% by weight of triethanolamine borate as a curing catalyst therefor, with certain highly desirable advantages. Furthermore, there may be included up to 10% of the weight of the glycidyl polyethers of either alkyl halides or metallo-organic complexes, or both, which will accelerate the curing at elevated temperatures and otherwise confer additional benefits. Triisopropanolamine borate also may be used.

The triethanolamine borate may be readily prepared by admixing substantially equimolar amounts of triethanolamine and boric acid. The mixture is subjected to evacuation to a pressure of less than one millimeter of mercury and then gradually heated to a temperature of approximately 150 to 155° C. The heating and evacuation will remove water of reaction. The resulting reaction product may be purified by recrystallization from acetonitrile. This preparation is set forth in J. A. C. S. 73, 2808, (1951). It will be understood that the triethanolamine borate may be prepared by other methods.

The glycidyl polyether of a dihydric phenol employed in the invention is obtainable by reacting epichlorhydrin with a dihydric phenol in an alkaline medium. The polyethers are prepared by heating the dihydric phenol with epichlorhydrin at about 50° C. to 150° C. using 1 to 2 or more mols of epichlorhydrin per mol of dihydric phenol. Also present is the base, such as sodium or potassium hydroxide in slight stoichiometric excess to the epichlorhydrin, i. e., about 2% to 30% excess. The heating is continued for several hours to effect the reaction, and the product is then washed free of salt and base. The product, instead of being a single simple compound, is generally a complex mixture of glycidyl polyethers, but the principal product may be represented by the formula:

where $n$ is an integer of the series 0, 1, 2, 3 . . ., and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form. The glycidyl polyethers are often designated as "epoxy resins." They may be liquids or viscous solids. The application of a solvent will enable solutions to be made for coating and dipping of members therewith.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The glycidyl polyethers of a dihydric phenol used in the invention have a 1,2-epoxy equivalency greater than 1.0. By the epoxy equivalency reference is made to the average number of 1,2-epoxy groups.

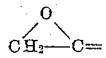

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2. However, in all cases it is a value greater than 1.0. The 1,2-epoxy equivalency of the polyethers is thus a value between 1.0 and 2.0.

The 1,2-epoxide value of the glycidyl polyether is determined by heating a weighed sample of the ether with an excess of 0.2 N pyridinium chloride in chloroform solution at the boiling point under reflux for 2 hours whereby the pyridinium chloride hydrochlorinates the epoxy groups to chlorhydrin groups. After cooling, the excess pyridinium chloride is back-titrated with 0.1 N sodium hydroxide in methanol to the phenol-phthalein end point. This method is used for obtaining all epoxide values discussed herein.

Any of the various dihydric phenols is used in preparing the polyethers including mononuclear phenols such as resorcinol, catechol, hydroquinone, methyl resorcinol, etc.; or polynuclear phenols like 2,2-bis(4-hydroxyphenyl)-propane which is termed bis-phenol herein for convenience, 4,4'-dihydroxybenzophenone, bis-(4-hydroxyphenyl)methane, 1,1-bis(4-hydroxyphenyl)ethane, 1,1 - bis(4 - hydroxyphenyl)isobutane, 2,2-bis(4-hydroxyphenyl) - butane, 2,2 - bis(4 - hydroxy - 2 - methylphenyl)propane, 2,2 - bis(4 - hydroxy - 2 - tertiarybutylphenyl)-propane, 2,2 - bis(2 - hydroxynaphthyl)-pentane, 1,5-dihydroxynaphthalene, etc.

Preferred polyethers used in the process are prepared from 2,2 - bis(4 - hydroxyphenyl)propane. They contain a chain of alternating glyceryl and 2,2-bis(4-phenylene)propane radicals separated by intervening ethereal oxygen atoms, have a 1,2-epoxy equivalency between 1.0 and 2.0, and have a molecular weight of about 1200 to 4000. More generally, it is preferred to employ glycidyl polyether of a dihydric phenol which has a value for $n$ in the above-mentioned structural formula of about 6 to 15.

Numerous metallo-organic complexes may be employed in combination with the triethanolamine borate in order to expedite polymerization at elevated temperatures. For this purpose there may be employed metal chelates which may be derived by reacting a metal or metal oxide or other metal compound with an organic compound of the following general formula:

$$X-\underset{\underset{O}{\|}}{C}-CH_2-\underset{\underset{Y}{\|}}{C}-CH_3$$

where X is selected from the group consisting of hydrocarbon, alkoxy, and hydrocarbon substituted amino radicals, and Y is selected from the group consisting of oxygen, and hydrocarbon substituted imino radicals, the substituted imino radicals being present only when X is a hydrocarbon radical. A typical metal chelate is chromium acetylacetonate believed to have the following structural formula:

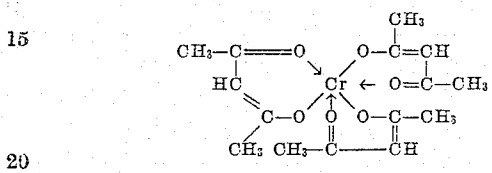

Other typical chelates are copper N,N'-ethyleneimine-bis-acetyl-acetonate; copper ethyl acetoacetate and chromium ethyl acetoacetate.

Metals of every group of the periodic table have been found to form metal chelates suitable for the practice of the invention. The ethyl acetoacetates of the following metals are effective:

| | |
|---|---|
| Lead | Vanadium |
| Copper | Bismuth |
| Barium | Chromium |
| Cadmium | Uranium |
| Cerium | Molybdenum |
| Aluminum | Tungsten |
| Nickel | Manganese |
| Thorium | Iron |
| Tin | Cobalt |

Examples of other suitable chelates are bis(salicylaldehydo)cobalt (II), and bis(salicylaldehydo)nickel (II).

The glycidyl polyethers, either liquid or solid or in an organic solvent to produce a solution thereof, may be admixed with the triethanolamine borate in proportions from about 2% to 18% by weight, with or without a metallo-organic complex. The triethanolamine borate in finely powdered form dissolves readily in the glycidyl polyethers, heating facilitating such solution. The composition may be stored for months at room temperature without any appreciable change. However, when subjected to elevated temperatures of from about 100° C. to 175° C. and higher, the liquid glycidyl polyether readily reacts and converts to hard, tough, cured resinous products. Such products have low electrical losses over all reasonable operating temperatures.

The glycidyl polyethers catalyzed with the triethanolamine borate are particularly suitable for electrical insulating applications. Thus solutions of the glycidyl polyethers in organic solvents when catalyzed with triethanolamine borate may be applied to electrical wire, cables, coils and windings as impregnating and insulating varnishes. Upon being subjected to heat, any solvent present evaporates and the glycidyl polyether resin then cures to hard, tough coatings. Liquid, completely reactive glycidyl polyethers without any organic solvent, are avialable. The powered triethanolamine borate may be dissolved therein by admixture to produce completely reactive compositions. These catalyzed completely reactive glycidyl polyether compositions may be employed for impregnating, potting, and casting applications. Thus laminated magnetic cores may be dipped in such liquid compositions, using vacuum and pressure if necessary in order to fill all of the spaces between laminations. After the magnetic cores are withdrawn from the composition, they may be heated and the composition between the laminations will cure into a hard, tough adhesive binder holding the laminations in a solid core.

Such cores are extremely resistant to delamination. In a number of tests, laminated cores bonded with these compositions were worked with a chisel in an attempt to separate the outer lamination. It took considerable effort including hammering, to separate the uppermost lamination from the core stack. The resin was found to have filled the interlaminar space completely and the resin was so adherent to the magnetic steel that the failure occurred within the resin rather than at the surface of the laminations. By contrast, magnetic cores bonded with a widely used phenolic resin composition were readily delaminated by simply inserting a chisel between the laminations and giving it a little twist, whereupon the entire lamination sprung off.

Electrical transformers, rectifiers and electronic components have been potted or cast within the completely reactive catalyzed glycidyl polyether compositions of this invention. Transformers comprising a magnetic core and associated windings, the windings being insulated with paper, glass and enamel or varnish coatings, have been potted with the glycidyl polyether compositions. In some cases, the electronic components comprising electrical tubes, condensers and circuit elements have been initially coated with an elastic resin such as a silicone elastomer or a thermoplastic resin such as polyethylene and then the assembly is potted in the catalyzed glycidyl-triethanolamine borate composition.

Referring to Figure 1 of the drawing there is illustrated a potted transformer 10 which comprises a magnetic core 12 provided with one winding 14 which comprises an electrical conductor 16 which is insulated with insulation 18 and another winding 20 which comprises a conductor 22 also insulated with insulation 24. The magnetic core 12 with its associated windings 14 and 20 are completely potted in the glycidyl polyether 26 which has been catalyzed with the triethanolamine borate composition.

It has been discovered furthermore that alkyl halides in an amount of not in excess of 3% of the composition may be added to the glycidyl-triethanolamine borate mixtures to produce accelerated curing at elevated temperatures. Examples of suitable alkyd halides are methyl iodide, ethyl bromide, propyl iodide and amyl chloride.

The following examples are illustrative of the practice of the invention.

EXAMPLE I

A glycidyl polyether is prepared by introducing into a reaction vessel equipped with agitator, cooling and heating means, distillation condenser and receiver, 513 parts (2.25 mols) of bis-phenol [2,2-bis(4-hydroxyphenyl) propane] and 208.1 parts (22.5 mols) of epichlorhydrin and 10.4 parts of water. A total of 188 parts of 97.5% sodium hydroxide, corresponding to 2.04 mols (2% excess) per mole of epichlorhydrin, is added in increments over several hours. The temperature in the vessel does not rise above 100° C. and is generally above 95° C. After all the sodium hydroxide is added, the excess water and epichlorhydrin is removed by evacuating to an absolute pressure of 50 mm. of mercury at 150° C. The vessel is then cooled to 90° C. and 36 parts of benzene added, and then cooled further to 40° C. with salt precipitating from the solution. The solution is filtered to remove the salt, the salt being washed with 36 additional parts of benzene, the benzene washing out any polyether resin and then being added to the filtrate and both returned to the vessel. The benzene is then distilled off, the polyether resin being heated at an increasing temperature until at 125° C. vacuum is applied and distillation is continued until the vessel contents are at 170° C. at 25 mm. of mercury absolute pressure. The resulting glycidyl polyether has a softening point of 9° C., using Durrans' mercury method, an average molecular weight of 370 and an epoxide equivalent weight of 200, and a 1,2-epoxy equivalence of 1.85.

Figure 2:
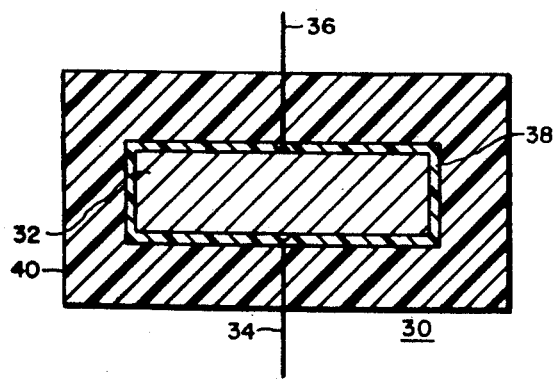
Figure 2 is a vertical cross sectional view through an encapsulated diode.

Germanium diodes having dimensions of approximately 1 inch in diameter and approximately 1/16 inch thick with current-carrying leads soldered thereto are extremely sensitive to the atmospheric conditions. Such diodes may be provided with a protective encapsulating coating as shown in Figure 2 of the drawing. The completed encapsulated diode 30 comprises a germanium wafer 32 to which are affixed electrical leads 34 and 36. The outer surface of the wafer 32 is coated with a layer 38 of a mixture of approximately equal parts of polyethylene and polyisobutyline resin and a subsequently applied surrounding body 40 of catalyzed glycidyl polyether. To produce the devices of Fig. 2, these germanium diodes 32 were coated with a mixture of polyethylene and polyisobutyline in approximately equal parts. The coated germanium diodes were then placed in a mold approximately 1½ inch in diameter and 1 inch deep. The mold was filled with a composition comprising 106 parts by weight of the glycidyl polyethers of this example and 3 parts of triethanolamine borate and ¾ of 1 part of chromium acetylacetonate. The mold with this composition was then placed in an oven and heated to a temperature of 130° C. for 4 hours. The cured composition was a hard, tough resin with a Shore D hardness of 88. Over a period of time of 6 weeks, no observable change in the characteristics of the germanium diodes was observed. The protection afforded by the cast composition was exceptionaly effective since other resinous coatings applied to similar germanium diodes had failed to protect them from atmospheric effects.

The uncured composition of this Example I was stored at room temperature for 2 months. Its initial viscosity was X on the Holdt-Gardner scale while at the end of the period the viscosity was only Y. This change in viscosity is so small that it does not measurably affect the use of the resin.

EXAMPLE II

The glycidyl polyether of Example I was admixed with 5% of its weight of triethanolamine borate. The composition was baked for 9 hours at 135° C. At the end of this time, it was a hard, tough resinous solid. To a portion of this composition, there was added 1% by weight of chromium acetylacetonate. To another portion there was added 2% chromium acetylacetonate. These compositions were also cured by heating for 9 hours at 135° C. Tests of the electrical properties of these compositions were made with the results shown in the following table, wherein TEAB designates triethanolamine borate:

*Table I*

| ⅛ inch samples | Temp. of Test, ° C. | Power Factor, Percent | | |
|---|---|---|---|---|
| Composition—Glycidyl Polyether of Example I plus— | | 60 cycle | 1 kc. | 100 kc. |
| 5% TEAB | 25 | 0.28 | 0.47 | 2.14 |
|  | 100 | 1.19 | 0.68 | 0.64 |
| 5% TEAB+1% Chromium Acetylacetonate | 25 | 0.29 | 0.47 | 2.07 |
|  | 100 | 1.12 | 0.59 | 0.62 |
| 5% TEAB+2% Chromium Acetylacetonate | 25 | 0.27 | 0.47 | 2.07 |
|  | 100 | 1.10 | 0.61 | 0.62 |
|  |  | 100 cycles | | |
| 5% diethylenetriamine | 25 | 5.78% | | |
|  | 100 | about 100% | | |

EXAMPLE III

To 100 grams of the glycidyl polyether of Example I admixed with triethanolamine borate to produce a 3% concentration of the latter therein, there was added 30 drops of methyl iodide. The mixture was put into an oven at 150° C. and it cured in several hours to a hard, tough resin.

EXAMPLE IV

To 100 parts by weight of the glycidyl polyether of Example I there was added 4 parts by weight of triethanolamine borate and one part by weight of the copper chelate of γ, γ, γ-trifluoroacetoacetic ester. The composition readily cured to a hard-tough material by heating 45 minutes at 105° C. followed by 1 hour at 135° C.

To a composition prepared from 100 parts of the glycidyl polyether of Example I and 4 parts of triethanolamine borate, there was added 1% by weight of bis(salicylaldehydo)cobalt (II). This composition was fully cured in 1½ hours heating at 135° C.

Another composition was prepared by adding 1 part of copper acetylacetonate to 100 parts by weight of a composition comprising the admixture of 4 parts of triethanolamine borate and 100 parts of the glycidyl polyether of Example I. A further composition was prepared by substituting for the copper acetylacetonate 1 part by weight of bis(salicylaldehydo)nickel (II). Both these last compositions cured to hard, tough resins in 1½ hours at 135° C. The power factors of all of these compositions of Example IV were less than 0.3 at 25° C. and less than 1.25% at 100° C., using 60 cycle current for the tests.

EXAMPLE V

The glycidyl polyether of Example I was combined with 4% by weight of triethanolamine borate and 0.67% by weight of chromium acetylacetonate and baked for 18 hours at 135° C. The power factor at 25° C., 60 cycle current, was 0.2%, and at 100° C. it was 1.17%.

EXAMPLE VI

A glycidyl polyether was prepared from 276 parts (3 mols) of glycerol mixed with 828 parts of epichlorhydrin (9 mols). To this reaction mixture were added 10 parts of the diethyl ether solution containing about 4.5 of boron trifluoride. The temperature rose as a result of the exothermic reaction and external cooling with ice water was applied so as to keep the temperature between about 50° C. and 75° C. during a reaction period of about 3 hours. About 370 parts of the resulting glycerolepichlorohydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 205° C. at 20 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in a dioxane solution. These values showed that the polyglycidyl ether had a 1,2-epoxy equivalency of 2.18—i. e., an average of about 2.2 epoxide groups per molecule.

A mixture comprising 90 parts by weight of the glycidyl polyethers and 10 parts by weight of triethanolamine borate was prepared. The composition cured to a hard solid in 2 hours at 140° C. This catalyzed composition had excellent tank life at room temperature showing little change in viscosity in months, and the cured resin had low power factor both at room temperature and at 100° C., using 60 cycle current.

EXAMPLE VII

A glycidyl polyether was prepared by reacting 2.6 mols of epichlorhydrin with one mol of bis phenol in the presence of 1.1 mols of sodium hydroxide per mol of epichlorhydrin following the procedure of Example I of Patent 2,548,447. The softening point of the resulting resin was 27° C. Its molecular weight was 469 and its epoxy equivalent was approximately 1.88.

A composition was prepared comprising 4% triethanolamine borate in the glycidyl polyether of this Example VII. To a portion of the catalyzed composition there was added further 0.5% by weight of chromium acetylacetonate. The catalyzed compositions were very stable at room temperature over a period of several months, with very little change in viscosity being observed. When heated for 2½ hours at 135° C., each of the compositions formed a hard cured solid with a power factor of less than .3% at 25° C., 60 cycles, while at 100° C., the power factor did not exceed 1.5% in both cases.

The use of triethanolamine borate has given highly satisfactory results; however, another trialkylolamine borate, namely, triisopropanolamine borate is a suitable catalyst for glycidyl polyethers. Equimolecular amounts of boric acid and isopropanolamine may be reacted by heating slowly to approximately 200° C. to drive off water. The reaction product comprises needle-shaped crystals which sublime at about 200° C. The melting point of the triisopropanolamine borate so produced varies over the range of 142° C. to 148° C.

The triisopropanolamine borate forms stable mixtures with glycidyl polyethers, but is a somewhat slower catalyst for curing glycidyl polyethers, taking several times as long at a given temperature, than does triethanolamine borate. Thus 7.5% of triisopropanolamine borate added to the glycidyl polyether of Example I required heating for 6½ hours at 200° C. to cure it.

Glycidyl polyethers reacted with acids may be catalyzed to promote rapid curing with triethanolamine borate, alone, or in combination with a paint drier such as cobalt naphthenate and lead naphthenate. The glycidyl polyethers comprise intermediate hydroxyl groups which can be reacted with fatty acids such as oleic acid, ricinoleic acid, linoleic acid and stearic acid. Also, maleic acid, phthalic acid, abietic acid and mixtures of two or more may be employed in the reaction with glycidyl polyethers to produce acid modified glycidyl polyethers. Thus, a reaction product of 9 parts maleic anhydride, 312 parts of oleic acid and 403 parts of a glycidyl polyether having a softening point of 110° C., with a small quantity of xylene, was prepared by refluxing for two hours at 220° C. The resinous product embodying xylene and 1% triethanolamine borate is added, based on the weight of the resinous product, and when coated on surfaces and baked at 175° C. produces hard, glossy coatings.

The glycidyl polyethers may be admixed with solids such as silica, titanium dioxide, glass fibers, wood flour, mica, graphite and calcium silicate. In some instances small amounts of other resins, such as phenolics, and alkyd resins, may be admixed with the glycidyl polyethers in the practice of the present invention. Furthermore, mixtures or blends of two or more epoxy resins, such as disclosed in application Serial No. 406,045, filed January 25, 1954, and assigned to the assignee of the present invention, now abandoned, may be sured by using the catalysts disclosed herein.

The glycidyl polyethers with the triethanolamine borate catalyst can be admixed with polyester resinous composition catalyzed with a peroxide catalyst and the mixtures can be readily cured. The curing of admixtures of (a) a polyester resinous composition catalyzed with a peroxide catalyst and (b) a glycidyl polyether catalyzed with a conventional amine catalyst such as piperidine or diethylene triamine, is greatly retarded and is not satisfactory because the amine catalysts inhibit the peroxide catalysts. A suitable satisfactorily curable composition in accordance with this invention will comprise from 10% to 90% by weight of a glycidyl polyether catalyzed with the triethanolamine borate and from 90% to 10% by weight of a polyester composition embodying a peroxide catalyst. Suitable polyesters are solutions of unsaturated alkyds, such as glycol maleate, propylene glycol fumarate and linseed oil modified castor oil maleate, in polymerizable monomers having the

group—such, for example, as monstyrene, diallyl phthalate and vinyl acetate, catalyzed with benzoyl peroxide or tert-butyl hydroperoxide.

It will be understood that the compositions of this invention are suitable for other than electrical applications. It will be understood further that the above description is exemplary and not exhaustive.

I claim as my invention:

1. A composition of matter comprising a reactive glycidyl polyether of a dihydric phenol and a curing catalyst therefor comprising triethanolamine borate derived by reacting substantially equimolar proportions of triethanolamine and boric acid.

2. A composition of matter comprising a reactive glycidyl polyether of a dihydric phenol, said polyether having a 1,2-epoxy equivalency of greater than 1, and admixed therein from about 2% to 18% by weight, based on the weight of glycidyl polyether, of triethanolamine borate derived by reacting substantially equimolar proportions of triethanolamine and boric acid.

3. The composition of claim 2, wherein up to 10% of the weight thereof comprises a metal-chelate metallo-organic complex, derived by reacting a metal compound with an organic compound having the formula

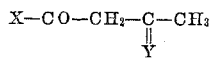

where X is selected from the group consisting of hydrocarbon, alkoxy, and hydrocarbon substituted amino radicals, and Y is selected from the group consisting of oxygen, and hydrocarbon substituted imino radicals, the substituted imino radicals being present only when X is a hydrocarbon radical, the hydrocarbon groups in each case being methyl groups.

4. The composition of claim 2, wherein up to 3% of the weight thereof comprises a short chain alkyl halide selected from the group consisting of alkyl iodides, chlorides and bromides.

5. The process of producing a resinous product which comprises admixing from 2 to 18 parts by weight of triethanolamine borate derived by reacting substantially equimolar proportions of triethanolamine and boric acid and 100 parts by weight of a glycidyl polyether of a dihydric phenol, and heating the mixture at temperatures of from about 100° C. to 200° C. to produce a hard cured resinous product.

6. The process of claim 5, wherein the glycidyl polyether is the reaction product of 1 mol of 2,2-bis(4-hydroxyphenyl) propane and from 1 to 2 mols of epichlorhydrin.

7. The cured resinous product produced by the process of claim 6.

8. An insulated electrical member comprising an electrical conductor and cured resinous insulation applied to the conductor, the resinous insulation having a low power factor both at room temperature and at temperatures of 100° C. and higher, the insulation comprising the reaction product of a glycidyl polyether of a dihydric phenol, said polyether having a 1,2-epoxy equivalency of greater than 1, and from about 2% to 18% by weight of triethanolamine borate derived by reacting substantially equimolar proportions of triethanolamine and boric acid.

9. The insulated electrial member of claim 8, wherein the electrical conductor is provided with a coating of insulation and the resinous insulation comprises a cast body enclosing the coated electrical conductor.

10. An electrical transformer comprising a magnetic core, electrical windings disposed about the magnetic core and a cured body of resinous insulation applied to the electrical windings, the resinous insulation comprising the reaction product of a glycidyl polyether of a dihydric phenol, said polyether having a 1,2-epoxy equivalency of greater than 1, and from about 2% to 18% by weight of triethanolamine borate derived by reacting substantially equimolar proportions of triethanolamine and boric acid.

11. A resinous composition comprising in combination a reactive glycidyl polyether and trialkylolamine borate derived by reacting substantially equimolar proportions of trialkylolamine and boric acid, selected from the group consisting of triethanolamine and triisopropanolamine borates admixed therein in an amount sufficient to enable the glycidyl polyether to be cured at a temperature of above 80% C., the composition being stable for long periods of time at temperatures of the order of 25° C.

12. A resinous composition comprising in combination an admixture of from 10% to 90% by weight of a reactive glycidyl polyether of a dihydric phenol, said polyether having a 1,2-epoxy equivalency of greater than 1, and admixed therein from about 2% to 18% by weight, based on the weight of glycidyl polyether, of triethanolamine borate derived by reacting substantially equimolar proportions of triethanolamine and boris acid, and from 90% to 10% by weight of a polyester resin obtained by the esterification of an ethylenically unsaturated dicarboxylic acid and a dihydric alcohol, admixed with a polymerizable monomer having a reactive vinylidene group, and a peroxide polymerization catalyst admixed in the polyester resin, the admixture being readily cured into a thermoset resinous solid.

References Cited in the file of this patent

UNITED STATES PATENTS

| | | |
|---|---|---|
| 2,444,333 | Castan | June 29, 1948 |
| 2,524,536 | Nordlander et al. | Oct. 3, 1950 |
| 2,549,309 | Hill et al. | Apr. 17, 1951 |
| 2,681,901 | Wiles et al. | June 22, 1954 |
| 2,691,007 | Cass | Oct. 5, 1954 |